US012693217B2

(12) United States Patent　　　　(10) Patent No.:　US 12,693,217 B2

Glover　　　　　　　　　　　　　　(45) Date of Patent:　Jul. 28, 2026

(54) MULTI-WAVELENGTH ABSORPTION WATER SENSOR WITH HIGH ULTRAVIOLET WAVELENGTH RESOLUTION AND EXTENDED VISIBLE AND NEAR INFRARED MEASUREMENT RANGE

(71) Applicant: ABB Schweiz AG, Baden (CH)

(72) Inventor: James Andrew Glover, Oshawa (CA)

(73) Assignee: ABB Schweiz AG, Baden (CH)

( * ) Notice:　Subject to any disclaimer, the term of this patent is extended or adjusted under 35 U.S.C. 154(b) by 112 days.

(21) Appl. No.: 18/895,175

(22) Filed:　Sep. 24, 2024

(65)　　　　Prior Publication Data

US 2025/0110049 A1　　Apr. 3, 2025

Related U.S. Application Data

(60) Provisional application No. 63/541,179, filed on Sep. 28, 2023.

(51) Int. Cl.
G01N 21/3577　　(2014.01)
G01N 21/31　　(2006.01)
　　　　(Continued)

(52) U.S. Cl.
CPC ......... G01N 21/3577 (2013.01); G01N 21/33 (2013.01); G01N 21/359 (2013.01);
　　　　(Continued)

(58) Field of Classification Search
CPC .. G01N 21/3577; G01N 21/33; G01N 21/359; G01N 21/8507; G01N 21/255;
　　　　(Continued)

(56)　　　　References Cited

U.S. PATENT DOCUMENTS 4,575,242 A　*　3/1986　Akiyama ................. G01J 3/04
　　　　　　　　　　　　　　　　356/334
9,395,246 B2 *　7/2016　Davenport ............... G01J 3/42
　　　　　　　　(Continued)

FOREIGN PATENT DOCUMENTS

CN　　106198424 A　　12/2016
WO　2022/136096 A1　　6/2022

OTHER PUBLICATIONS

Canadian Office Action for Application No. 3,255,186, dated Oct. 28, 2025, 8 pages.

(Continued)

*Primary Examiner* — Sang H Nguyen
(74) *Attorney, Agent, or Firm* — McCarter & English, LLP

(57)　　　　ABSTRACT

An apparatus and method for measuring absorption of a liquid at several highly resolved wavelengths in the ultraviolet light spectrum with additional wavelengths or wavelength groups in the visible and/or near infrared light spectrum is provided. The apparatus includes a submersible housing that incorporates a broad band light source that emits ultraviolet, visible, and near infrared light, optical windows defining a measurement region of the liquid, an optical chopper unit to alternate between reference and measured light beams, an optical sensor to detect a specific wavelength or group of wavelengths in the visible or near infrared light spectrum from the broadband light source, a slit to define the broadband light geometry onto a diffraction grating, the diffraction grating to modify the broad band light beam into highly wavelength resolved ultraviolet wavelengths, and a line sensor to detect the highly wavelength resolved ultraviolet light.

20 Claims, 2 Drawing Sheets

(51) Int. Cl.
  *G01N 21/33*   (2006.01)
  *G01N 21/359*  (2014.01)

(52) U.S. Cl.
  CPC ................ *G01N 2021/3129* (2013.01); *G01N 2201/0218* (2013.01)

(58) Field of Classification Search
  CPC .......... G01N 21/31; G01N 2021/3129; G01N 2201/0218; G01N 2021/3155; G01N 33/18; G01N 2201/0627; G01N 2201/082; G01J 3/42
  See application file for complete search history.

(56)     References Cited

U.S. PATENT DOCUMENTS

2006/0238764 A1* 10/2006 Hafeman ............. G01N 21/314
                356/319
2007/0138401 A1  6/2007 Tokhtuev et al.

| | | | | |
|---|---|---|---|---|
| 2008/0008623 A1* | 1/2008 | Reed | ...................... | G01N 21/49 |
| | | | | 422/63 |
| 2011/0043792 A1* | 2/2011 | Arimoto | ............... | G01J 3/0218 |
| | | | | 356/213 |
| 2014/0063497 A1* | 3/2014 | Sano | ......................... | G01J 3/18 |
| | | | | 356/326 |
| 2016/0258913 A1* | 9/2016 | Uchiho | .................. | G01N 30/74 |
| 2018/0267007 A1* | 9/2018 | Laflamme | ............. | G01N 21/33 |
| 2019/0098179 A1* | 3/2019 | Hung | .................... | H04N 23/11 |
| 2022/0276162 A1* | 9/2022 | Glover | ................. | G01N 21/314 |
| 2022/0412803 A1* | 12/2022 | Sanden | ................. | G01J 3/0229 |

OTHER PUBLICATIONS

Zhuang et al., Optical design of UV-VIS spectrophotometer for water quality detection. Proc of SPIE. 2023;12617:1261779-1-1261779-11.
European Office Action for Application No. 24203233.2, dated Jan. 23, 2025, 10 pages.

* cited by examiner

MULTI-WAVELENGTH ABSORPTION WATER SENSOR WITH HIGH ULTRAVIOLET WAVELENGTH RESOLUTION AND EXTENDED VISIBLE AND NEAR INFRARED MEASUREMENT RANGE

CROSS-REFERENCE TO RELATED APPLICATIONS

This application claims priority to U.S. Provisional Patent Application No. 63/541,179, filed Sep. 28, 2023 and titled "MULTIWAVELENGTH ABSORPTION WATER SENSOR WITH HIGH UV WAVELENGTH RESOLUTION AND EXTENDED VISIBLE AND NIR MEASUREMENT RANGE", the entire contents of which is hereby incorporated by reference.

TECHNICAL FIELD

This disclosure is related to the field of water quality monitoring using light absorption measurements in the ultraviolet light spectrum. In general, the disclosure relates to the measurement of nitrogen compounds and organic compounds in water.

BACKGROUND

Measuring organic compounds and nitrogen compounds is needed for many applications in industrial and municipal water and wastewater as well as environmental or surface water monitoring.

Several types of instruments are available for measuring these compounds in the lab. However, these lab instruments often use measurements methods that require the use of reagents and often each measurement incorporates several hours of reaction time before the test is complete.

In order to measure organic and nitrogen compounds in real-time in the field, instruments must utilize more practical measurement methods. In particular, methods that do not require reagents and can be performed quickly with negligible reaction time are more suited to field applications.

The existing state of the art of instruments for the measurement of organic and nitrogen compounds includes instruments that measure an absorption spectrum of the water in the UV and visible light region, and sometimes into the near infrared (NIR) light region. In particular, wavelengths from two hundred nm to three hundred and fifty nm must be measured in order to detect and distinguish between different groups of organics and nitrogen compounds such as nitrates, nitrites and aromatic organics, whereas wavelengths above three hundred and fifty nm and into the visible region of the light spectrum are used to detect particulate, colloids and other turbidity causing compounds in the water. The measurement of particulate, colloids and other turbidity causing compounds is often best accomplished by a dedicated instrument, such as a nephelometer based instrument, or an absorbance instrument using visible or NIR wavelengths. In the context of instruments designed to measure organic and nitrogen based compounds the visible (VIS) and/or NIR wavelengths are primarily used to compensate the measurements in the ultraviolet (UV) light region for interference from particulate, colloids, and other turbidity causing compounds, to ensure more accurate measurement of organic and nitrogen compounds.

As a result of the above requirements for absorption spectrum instruments for measurement of organic and nitrogen compounds in water, several instruments are available in the market that incorporate several key optical components including a broad band light source such as a xenon flash lamp, a dispersion element such as a transmission or reflecting diffraction grating, and a line imaging sensor such as a CCD or a photodiode array. The light emitted from the light source transmits through a region of water under test towards a diffraction grating which resolves the transmitted broad band light into different wavelengths or groups of wavelengths. The line sensor detects the wavelength resolved light and provides a measure of intensity of light at each wavelength or group of wavelengths. Instruments can be configured primarily depending on the design of the diffraction grating, which determines the potential wavelength range of the instrument along with the wavelength resolution of the instrument.

In general, for a practical field instrument there is a design trade-off between wavelength resolution and wavelength range. For a number of applications such as for surface water detection of nitrogen compounds as a group, the requirements for the wavelength resolution of the instrument is approximately five nm which allows the use of a diffraction grating design that includes a full UV/VIS wavelength range while still maintaining adequate wavelength resolution of five nm. However, for applications that require the capability to distinguish between compounds with similar absorption spectrums, such as to distinguish between nitrate and nitrite compounds in wastewater, a wavelength resolution of less than one nm is needed. In this case, the region of the spectrum relevant for the measurement of nitrates and nitrates is primarily less than two hundred and fifty nm and being able to measure less than one nm wavelength resolution in this less than two hundred and fifty nm UV light region takes precedence over wavelength range. As a result, available instruments for this application must use a diffraction grating with high wavelength resolution less than two hundred and fifty nm and therefore due to grating design trade-offs they are unable to provide any significant absorption measurement in the visible light region or NIR light region. This means these instruments are often not able to adequately compensate the UV absorption measurements of nitrates and nitrites from the interference caused by particulate, colloids and other turbidity causing compounds.

The inability of exiting instrument designs to allow adequate measurement compensation of organic and nitrogen compounds for particulate, colloids and other turbidity causing compounds, is particularly problematic since some of the most valuable applications requiring less than one nm wavelength resolution in the UV light region, also have a large amount of these interfering compounds present. This leads to poor measurement performance of state of the art instruments in these more challenging applications. Therefore, there is a need for an improved instrument design that is able to both measure at UV light at a wavelength resolution less than one nm, while also providing measurement of visible or NIR light wavelengths.

BRIEF DESCRIPTION

In one embodiment, a submersible apparatus for measuring light absorption of a liquid sample surrounding the apparatus is provided. The apparatus includes a broadband light source, a measurement region, a light sensor, an optical slit, a diffraction grating, and a line senor array. The broadband light source configured to output broadband light in an ultraviolet light spectrum and light in one or more of a visible light spectrum and a near infrared light spectrum.

The measurement region includes the liquid sample, which propagates the broadband light emitted from the broadband light source. The light sensor is configured to detect an intensity of visible or near infrared light from the broadband light emitted by the broadband light source. The optical slit configured to produce an approximate point source of light from the broadband light emitted by the broadband light source. The diffraction grating is configured to resolve the broadband light propagating from the optical slit into a plurality of resolved and substantially adjacent narrow ultraviolet bandwidth regions, and the line sensor array is configured to detect a plurality of individual light intensities corresponding to the ultraviolet bandwidth regions produced by the diffraction grating.

In another embodiment, a method operable by a controller of a submersible apparatus for measuring light absorption of a liquid sample surrounding the apparatus is provided. The apparatus includes a broadband light source, a measurement region, a light sensor, an optical slit, a diffraction grating, and a line senor array. The broadband light source configured to output broadband light in an ultraviolet light spectrum and light in one or more of a visible light spectrum and a near infrared light spectrum. The measurement region includes the liquid sample, which propagates the broadband light emitted from the broadband light source. The light sensor is configured to detect an intensity of visible or near infrared light from the broadband light emitted by the broadband light source. The optical slit configured to produce an approximate point source of light from the broadband light emitted by the broadband light source. The diffraction grating is configured to resolve the broadband light propagating from the optical slit into a plurality of resolved and substantially adjacent narrow ultraviolet bandwidth regions, and the line sensor array is configured to detect a plurality of individual light intensities corresponding to the ultraviolet bandwidth regions produced by the diffraction grating. The method comprises recording and outputting the intensity measurements of visible or near infrared light detected by the light sensor, recording and outputting the intensity of the plurality of individual light intensities corresponding to the ultraviolet bandwidth regions detected by the line sensor array, and calculating an absorbance of light by the liquid sample using the recorded intensity measurements of ultraviolet and visible or near infrared light.

BRIEF DESCRIPTION OF THE DRAWINGS

The disclosure will be more fully understood from the following detailed description thereof taken in connection with the accompanying drawing, which form a part of this application, and in which.

DETAILED DESCRIPTION

Figure 1:
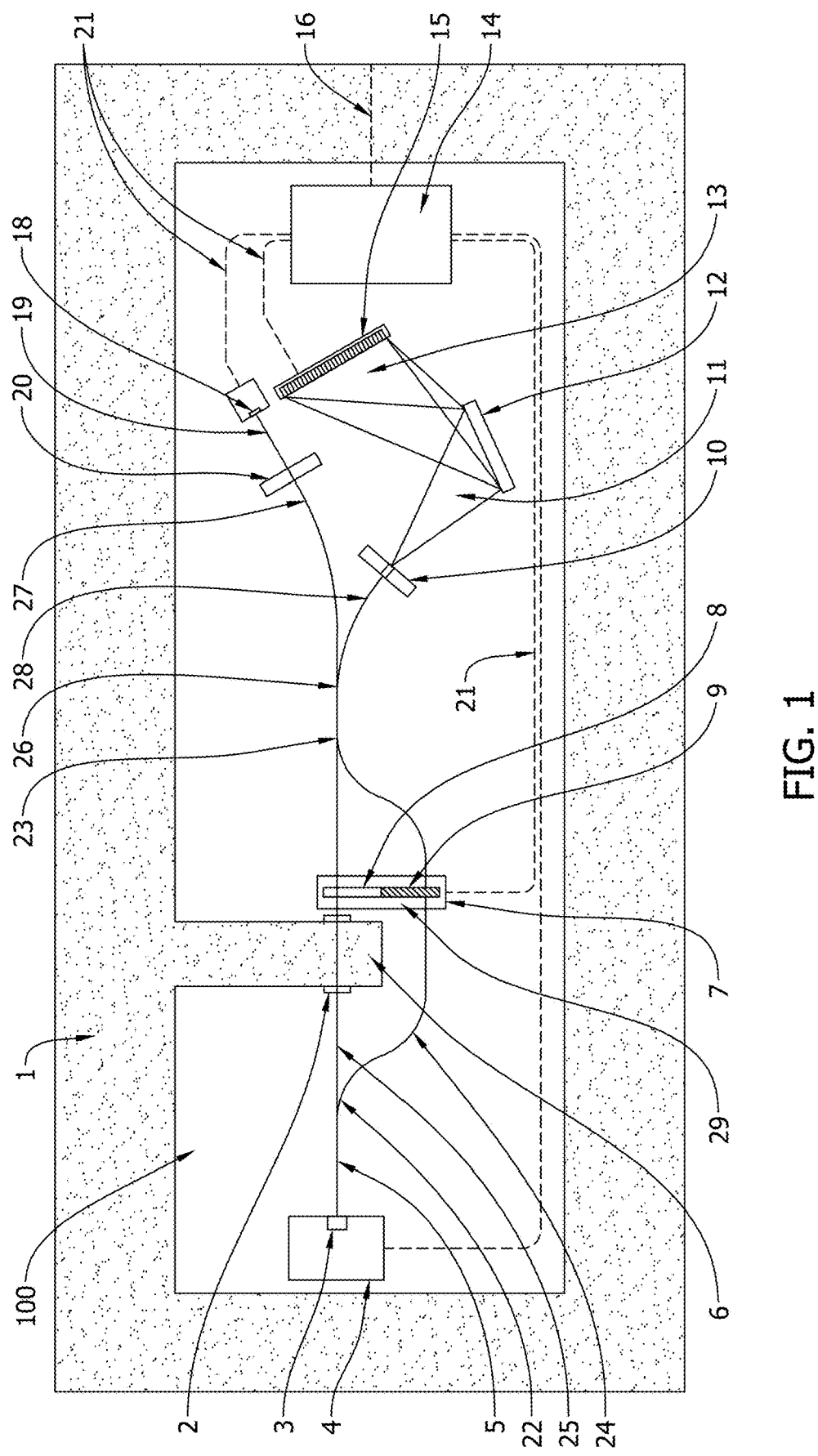
FIG. 1 depicts a submersible apparatus for the measurement of water quality parameters in an exemplary embodiment.

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

Without limitation, the majority of the systems described herein are directed to an apparatus and method of measuring optical properties of a liquid, such as water. Various embodiments of the present disclosure are described herein. However, the disclosed embodiments are merely exemplary, and it should be understood that the disclosure may be embodied in many various and alternative forms.

The figure(s) are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present disclosure. For purposes of teaching and not limitation, the illustrated embodiments are directed to real-time industrial and municipal water and liquid quality monitoring.

As used herein, the coordinating conjunction "and/or" is meant to be a selection between a logical disjunction and a logical conjunction of the adjacent words, phrases, or clauses. Specifically, the phrase "X and/or Y" is meant to be interpreted as "one or both of X and Y" wherein X and Y are any word, phrase, or clause.

As used herein, the term "fluid" refers to any liquid, gas, or substance that continually deforms under an applied shear stress.

As used herein, the term "light" refers to any electromagnetic radiation, and is not limited to wavelengths of visible light. For example, "light" may refer to radio waves, microwaves, infrared radiation, visible light, ultraviolet radiation, X-rays, or gamma rays.

| Parts List | |
|---|---|
| 20 | Probe Sensor |
| 1 | Water Under Test |
| 2 | Optical Windows |
| 3 | Broadband Light Source |
| 4 | Power Supply for Broadband Light Source |
| 5 | Broadband Light Beam |
| 6 | Water Measurement Region |
| 7 | Shutter Actuator and Assembly |
| 8 | First Position of Shutter |
| 9 | Second Position of Shutter |
| 10 | Optical Slit |
| 11 | Broadband Light |
| 12 | Diffraction Grating |
| 13 | Wavelength Resolved Light |
| 14 | Controller and Power Unit |
| 15 | Line Sensor Array |
| 16 | Control and Power Lines to External Controller |
| 17 | Internal Control and Power Lines |
| 18 | Photodiode Sensor |
| 19 | Narrow Band Light Beam |
| 20 | Optical Filter |
| 21 | Control Lines |
| 22 | Broadband Light Beam First Splitter |
| 23 | Broadband Light Beam Combiner |
| 24 | Reference Light Beam |
| 25 | Measurement Light Beam |
| 26 | Broadband Light Beam Second Splitter |
| 27 | Broadband Split Beam A |
| 28 | Broadband Split Beam B |
| 29 | Shutter |

FIG. 1 depicts a submersible apparatus 100 for the measurement of water quality parameters in an exemplary embodiment. Water under test 1 is the liquid in which apparatus 100 is submersed and that which is measured by apparatus 100. Water under test 1 is intended to flow freely into a water measurement region 6 of apparatus 100, as defined by optical windows 2 of apparatus 100.

A broadband light beam 5 of apparatus 100 is defined as a light beam having a bandwidth incorporating the ultraviolet, visible and near infrared regions of the light spectrum. Alternatively, broadband light beam 5 may only include broadband light in the ultraviolet light region, and at least one narrow band light source in the visible or near infrared region. Alternatively, broadband light beam 5 may include broadband light in the ultraviolet region and visible region, omitting light in the near infrared region.

A broadband light source 3 of apparatus 100 is used as a source of ultraviolet, visible and infrared light. In one embodiment, broadband light source 3 is a xenon flash lamp. Alternatively, broadband light source 3 may be composed of several narrow band light sources such as light emitting diodes (LEDs), or a broadband source in combination with at least one narrow band light sources. The main requirement is that broadband light source 3 provides broadband light in the ultraviolet light spectrum and some bandwidth in the visible or near ultraviolet light spectrum.

Broadband light beam 5 emitted by broadband light source 3 is split 22 into two broadband light beams: a first part comprising a reference light beam 24, and a second part comprising a measurement light beam 25. Reference light beam 24 and measurement light beam 25 ideally comprise identical light bandwidths. In one embodiment, each of reference light beam 24 and measurement light beam 25 are ideally of similar amplitude, but this is not required. In an embodiment, reference light beam 24 and measurement light beam 25 are directed using total internal reflection via ultraviolet transmitting fused silica fiber optics. Reference light beam 24 and measurement light beam 25 may be directed using a number of free space optical components. Broadband light beam split 22 may be implemented using fiber optic fusing techniques or other collimation optics.

Reference light beam 24 is directed around water measurement region 6 towards a shutter actuator and assembly 7 of apparatus 100. Measurement light beam 25 is directed through water measurement region 6 via two opposed optical windows 2 that define a path therethrough. Measurement light beam 25 exits water measurement region 6 and is directed towards shutter actuator and assembly 7.

Shutter actuator assembly 7 includes a shutter 29 connected to an actuator (not shown) that provides capability for shutter 29 to alternately move between two positions. A first position 8 of shutter 29 physically blocks the measurement light beam 24, and a second position 9 of shutter 29 physically blocks reference light beam 25. Therefore, shutter actuator assembly 7 ultimately allows alternating measurements to be taken of reference light beam 24 and measurement light beam 25 at different times. This alternation between reference and measurement light beams 24, 25 allows apparatus 100 to effectively compensate the measurement of light absorption of water under test 1, for changes in the output of the broadband light source 3. Such changes could be due to aging of broadband light source 3 or due to effects of ambient or water temperature changes affecting broadband light source 3 and a power supply 4 for broad band light source 3.

In one embodiment, reference light beam 24 and measurement light beam 25 are combined at a light beam combiner 23 of apparatus 100, with the understanding that the combining of beams is in the sense of the direction of the optics of the beam, noting that reference light beam 24 and measurement light beam 25 are not able to propagate beyond shutter actuator assembly 7 simultaneously.

In another embodiment, the combined broadband light beam is then split again at a light beam second splitter 26 of apparatus 100, in a similar manner to light beam first splitter 22, whereby the bandwidth of each split light beam 27, 28 is ideally identical. In an embodiment, each of the two light beams 27, 28 are of ideally similar amplitude, but this is not required.

Broadband light split beam A 27 is directed towards an optical filter 20 of apparatus 100. Optical filter 20 enables filtering of the broadband light split beam A 27 into a narrower band of visible or near infrared light. The resulting narrow band light beam 19 continues to propagate towards a photodiode sensor 18. Photodiode sensor 18 detects the intensity of the filtered narrow band light beam 19. Photodiode sensor 18 may be referred to as a light sensor in some embodiments. In some embodiments, apparatus 100 does not include optical filter 20. In these embodiments, photodiode sensor 18 detects the intensity of narrow band light directly from broadband light split bean A 27 without the use of optical filter 20. For example, photodiode sensor 18 may have a particular wavelength sensitivity range suitable for use in measuring a narrower band of visible or near infrared light directly from broadband light split beam A 27.

Broadband light split beam B 28 is directed towards an optical slit 10 of apparatus 100. Optical slit is configured to produce an approximate point source of light from broadband light beam 5 emitted by broadband light source 3. Light propagating from light split beam B 28 through optical slit 10, continues towards a diffraction grating 12 of apparatus 100. In one embodiment diffraction grating 12 is a reflecting diffraction grating. However, a transmission grating can be used in place of a reflecting grating with some changes to the geometry of the arrangement of optical components in apparatus 100. Apparatus 100 utilizes diffraction grating 12 to resolve the incident broadband light 11 into substantially individual light wavelengths such that the resulting wavelength optical resolution is, in some embodiments, not greater than one nm in the ultraviolet light region with the primary requirement for resolution in the two hundred nm to three hundred nm ultraviolet light spectrum. In some embodiments, diffraction grating 12 is configured to resolve light split beam B 28 propagating from the optical slit into at least ten resolved and substantially adjacent narrow ultraviolet bandwidth regions, wherein each bandwidth region is not more than two nanometers Wavelength resolved light 13 propagates toward a line sensor array 15 of apparatus 100, whereby individual pixel in line sensor array 15 are arranged to individually detect less than one nm bandwidths of light in the ultraviolet light spectrum. In one embodiment line sensor array 15 is a charge coupled device (CCD). However, line sensor array 15 may be a photodiode array (PDA), or other equivalent line sensor array device. Line sensor array 15 is configured to detect a plurality of individual light intensities corresponding to the ultraviolet bandwidth regions produced by diffraction grating 12. In some embodiments, the line sensor array 15 is configured to detect at least ten individual light intensities corresponding to the ultraviolet bandwidth regions produced by diffraction grating 12.

A controller 14 of apparatus 100 is connected to electronic and electromechanical components of apparatus 100 via internal control and power lines 17, including shutter actuator and assembly 7, power supply 4 for broadband light source 3, photodiode sensor 18, and line sensor array 15. External control and power lines 16 are connected to controller 14, and allow external control, power supply and communication with external equipment.

Figure 2:
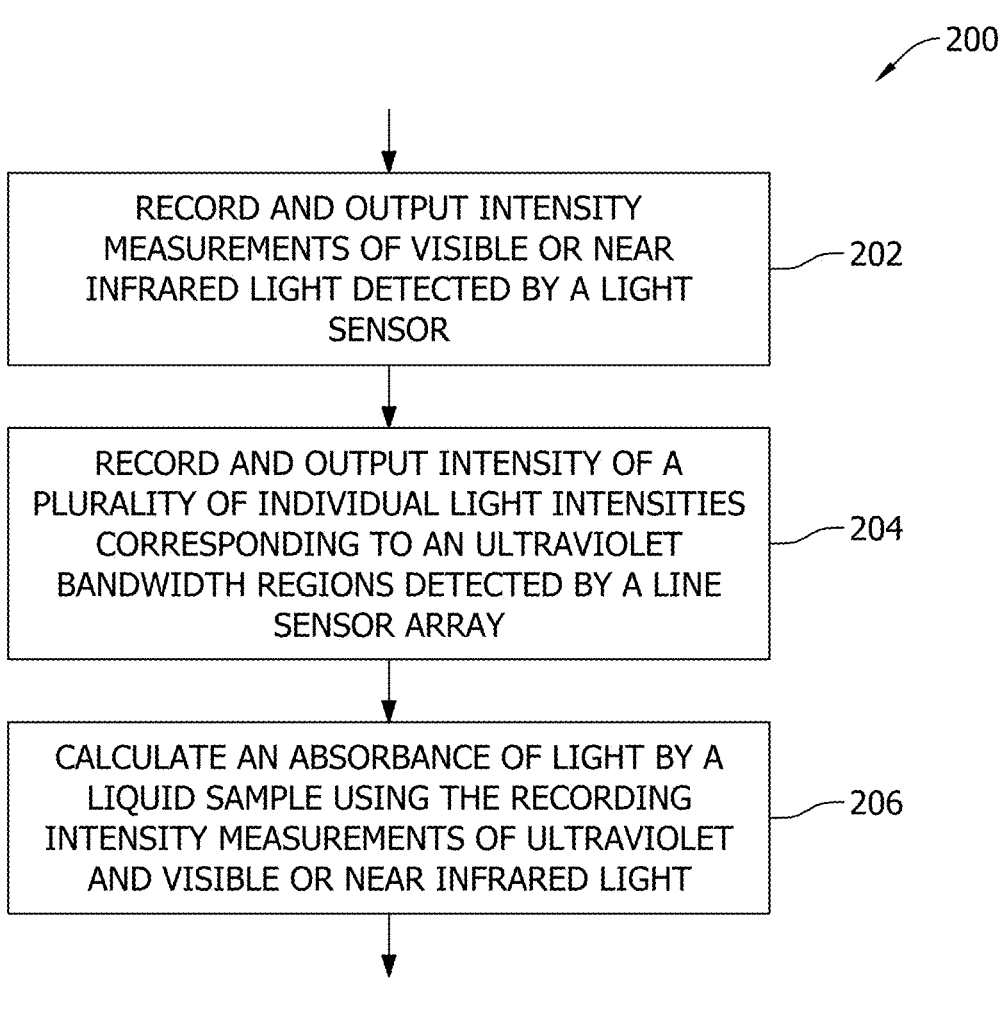
FIG. 2 depicts a block diagram of a method operable by a controller of a submersible apparatus for measuring light absorption of a liquid sample surrounding the submersible apparatus.

FIG. 2 depicts a block diagram of a method 200 operable by controller 14 of apparatus 100 for measuring light absorption of a liquid sample surrounding apparatus 100.

In one embodiment, controller 14 records and outputs 202 the intensity measurements of visible or near infrared light detected by photodiode sensor 18. Controller 14 records and outputs 204 the intensity of a plurality of individual light intensities (e.g., at least ten individual light intensities) corresponding to the ultraviolet bandwidth regions detected by line sensor array 15. Controller 14 then calculates 206 the absorbance of light by water under test 1 using the recorded intensity measurements of ultraviolet and visible or near infrared light. In some embodiments, controller 14 separately records intensity measurements during periods when shutter 29 is in first position 8 and during periods when shutter 29 is in second position 9, and calculates the absorption of water under test 1 with compensation for changes in the raw light output of broadband light source 3.

The foregoing description of the embodiments of the disclosure has been presented to illustrate the principles of the disclosure and not to limit the disclosure to the particular embodiment illustrated. It is intended that the scope of the disclosure be defined by all of the embodiments encompassed within the following claims and their equivalents.

What is claimed is:

1. A submersible apparatus for measuring light absorption of a liquid sample surrounding the submersible apparatus, the submersible apparatus comprising:

a broadband light source configured to output broadband light in an ultraviolet light spectrum and light in one or more of a visible light spectrum and a near infrared light spectrum;

a measurement region configured to include the liquid sample, which propagates the broadband light emitted from the broadband light source;

a light beam splitter configured to split the broadband light, after passing through the measurement region, into a first light beam and a second light beam;

a light sensor configured to detect an intensity of visible or near infrared light from the first light beam;

an optical slit configured to produce an approximate point source of light from the second light beam;

a diffraction grating configured to resolve the second light beam propagating from the optical slit into a plurality of resolved and substantially adjacent narrow ultraviolet bandwidth regions; and a line sensor array configured to detect a plurality of individual light intensities corresponding to the substantially adjacent narrow ultraviolet bandwidth regions produced by the diffraction grating.

2. The submersible apparatus of claim 1, further comprising an optical splitter configured to substantially split the broadband light emitted from the broadband light source, wherein:

a first part of the emitted light is directed to propagate through the measurement region containing the liquid sample and constitutes a measurement beam; and a second part of the emitted light is directed around the measurement region and constitutes a reference beam.

3. The submersible apparatus of claim 2, wherein:

the measurement beam and the reference beam comprise substantially identical light bandwidths.

4. The submersible apparatus of claim 2, wherein:

the measurement beam and the reference beam comprise substantially identical amplitudes.

5. The submersible apparatus of claim 2, wherein:

the optical splitter comprises ultraviolet transmitting fused silica fiber optics.

6. The submersible apparatus of claim 2, further comprising an actuator and shutter assembly, wherein the actuator and shutter assembly is configured to alternately move between:

a first position whereby the shutter substantially blocks propagating light of the measurement beam; and a second position whereby the shutter substantially blocks propagating light of the reference beam.

7. The submersible apparatus of claim 6, further comprising a controller connected to the broadband light source, the light sensor, and the line sensor array, wherein the controller is configured to:

record and output the intensity measurements of visible or near infrared light detected by the light sensor;

record and output the intensity of the plurality of individual light intensities corresponding to the ultraviolet bandwidth regions detected by the line sensor array; and calculate an absorbance of light by the liquid sample using the recorded intensity measurements of ultraviolet and visible or near infrared light.

8. The submersible apparatus according to claim 7, wherein the controller is further configured to:

separately record intensity measurements during periods when the shutter is in the first position and during periods when the shutter is in the second position; and calculate the absorption of the liquid sample with compensation for changes in the raw light output of the broadband light source.

9. The submersible apparatus of claim 1, further comprising a controller connected to the broadband light source, the light sensor, and the line sensor array, wherein the controller is configured to:

record and output the intensity measurements of visible or near infrared light detected by the light sensor, and the intensity of the plurality of individual light intensities corresponding to the ultraviolet bandwidth regions detected by the line sensor array; and calculate an absorbance of light by the liquid sample using the recorded intensity measurements of ultraviolet and visible or near infrared light.

10. The submersible apparatus of claim 1, wherein:

the diffraction grating is further configured to resolve the second light beam propagating from the optical slit into at least ten resolved and substantially adjacent narrow ultraviolet bandwidth regions, wherein each bandwidth region is not more than two nanometers, and the line sensor array is further configured to detect at least ten individual light intensities corresponding to the ultraviolet bandwidth regions produced by the diffraction grating.

11. The submersible apparatus of claim 1, wherein:

the broadband light source is further configured to output the broadband light only in the ultraviolet light spectrum, along with at least one narrow band light in the visible light spectrum or the near infrared light spectrum.

12. The submersible apparatus of claim 11, wherein:

the at least one narrow band light is in the visible light spectrum.

13. The submersible apparatus of claim 1, further comprising:

an optical filter configured to produce a narrow band of visible or infrared light from the first light beam, wherein the light sensor is configured to detect an intensity of visible or near infrared light produced by the optical filter.

14. A method operable by a controller of a submersible apparatus for measuring light absorption of a liquid sample surrounding the submersible apparatus, wherein:

the submersible apparatus comprises:

a broadband light source configured to output broadband light in an ultraviolet light spectrum and light in one or more of a visible light spectrum and a near infrared light spectrum;

a measurement region including the liquid sample, which propagates the broadband light emitted from the broadband light source;

a light beam splitter configured to split the broadband light, after passing through the measurement region, into a first light beam and a second light beam;

a light sensor configured to detect an intensity of visible or near infrared light from the first light beam;

an optical slit configured to produce an approximate point source of light from the second light beam;

a diffraction grating configured to resolve the second light beam propagating from the optical slit into a plurality of resolved and substantially adjacent narrow ultraviolet bandwidth regions; and a line sensor array configured to detect a plurality of individual light intensities corresponding to the ultraviolet bandwidth regions produced by the diffraction grating, and the method comprises:

recording and outputting the intensity measurements of visible or near infrared light detected by the light sensor;

recording and outputting the intensity of the plurality of individual light intensities corresponding to the ultraviolet bandwidth regions detected by the line sensor array; and calculating an absorbance of light by the liquid sample using the recorded intensity measurements of ultraviolet and visible or near infrared light.

15. The method of claim 14, wherein the submersible apparatus further comprises an optical splitter configured to substantially split the broadband light emitted from the broadband light source, and wherein:

a first part of the emitted light is directed to propagate through the measurement region containing the liquid sample and constitutes a measurement beam; and a second part of the emitted light is directed around the measurement region and constitutes a reference beam.

16. The method of claim 15, wherein:

the submersible apparatus further comprises an actuator and shutter assembly, the actuator and shutter assembly are configured to alternately move, under direction of the controller, between:

a first position whereby the shutter substantially blocks propagating light of the measurement beam; and a second position whereby the shutter substantially blocks propagating light of the reference beam, and the method further comprises:

separately recording intensity measurements during periods when the shutter is in the first position and during periods when the shutter is in the second position; and calculating the absorption of the liquid sample with compensation for changes in the raw light output of the broadband light source.

17. The method of claim 15, wherein:

the diffraction grating is further configured to resolve the second light beam propagating from the optical slit into at least ten resolved and substantially adjacent narrow ultraviolet bandwidth regions, wherein each bandwidth region is not more than two nanometers, and the line sensor array is further configured to detect at least ten individual light intensities corresponding to the ultraviolet bandwidth regions produced by the diffraction grating.

18. The method of claim 15, wherein:

the broadband light source is further configured to output the broadband light only in the ultraviolet light spectrum, along with at least one narrow band light in the visible light spectrum or the near infrared light spectrum.

19. The method of claim 15, wherein:

the at least one narrow band light is in the visible light spectrum.

20. The method of claim 15, wherein:

the submersible apparatus further comprises:

an optical filter configured to produce a narrow band of visible or infrared light from the broadband light emitted by the broadband light source, wherein the light sensor is configured to detect an intensity of visible or near infrared light produced by the optical filter.

\* \* \* \* \*